United States Patent [19]
Upchurch

[11] Patent Number: 5,520,130
[45] Date of Patent: May 28, 1996

[54] BOAT HAVING HULL MEMBERS WITH SEPARATE FORE AND AFT PLANING SURFACES

[76] Inventor: David P. Upchurch, 1436 SW. 72nd St., Oklahoma City, Okla. 73159

[21] Appl. No.: 304,739

[22] Filed: Sep. 12, 1994

[51] Int. Cl.$^6$ .................................................. B63B 1/00
[52] U.S. Cl. .................... 114/61; 114/67 R; 114/283; 114/292
[58] Field of Search ............... 114/39.1, 61, 67 R, 114/219, 357, 271, 274, 291, 292, 352, 56, 57, 283

[56] References Cited

U.S. PATENT DOCUMENTS

| | | | |
|---|---|---|---|
| 1,712,281 | 5/1929 | Royer | 114/291 |
| 3,796,175 | 3/1974 | Ford et al. | 114/61 |
| 3,831,540 | 8/1974 | Case | 114/61 |
| 3,839,979 | 10/1974 | Wassell | 114/354 |
| 3,937,166 | 2/1976 | Lindsay | 114/123 |
| 4,635,577 | 1/1987 | Palmquist | 114/39 |
| 4,644,890 | 2/1987 | Lott | 114/61 |
| 4,748,929 | 6/1988 | Payne | 114/61 |
| 4,947,785 | 8/1990 | Milne | 114/357 |

OTHER PUBLICATIONS

Sales brochure (date unknown), published by Nacra in Carpenteria, California.
"Miracle" sales brochure published in 1991 by Hobie Cat Company in Oceanside, California.
"The Leading Edge" article in the Jan. 1994 issue of *Sailing World*.
"Are You Hardcore" (date unknown) sales brochure published by Hardcore Catamarans Ltd. in New Castle, Delaware.
"Hobie Cat . . . A Way of Life" sales brochure, published in 1987 by Coast Catamaran Corp. (Hobie Cat)in Oceanside, California.
Price List and sales brochure published in 1987 by Planecat Corporation in Algonac, Michigan.
Sales brochure (date unknown) published by Dumas Products, Inc. in Tucson, Arizona.
Sales brochure published in Aug., 1994 issue of *Hot Boat*.
Rendezvous Sales brochure published by Bayliner Marine Corp. Jul., 1993.
"The New Speed Spectrum" article, p. 24, *Sailing World*, Mar., 1993 issue.
Videotape of television show about boats.

*Primary Examiner*—Stephen Avila
*Attorney, Agent, or Firm*—Dunlap & Codding

[57] ABSTRACT

A boat having a pair of hull members with separate fore and after planing surfaces. Each one of the hulls has a forebottom surface, an aftbottom surface and a midbottom surface. The forebottom surfaces and the aftbottom surfaces have positive trim angles. Each midbottom surface is recessed into the respective hull member. When propelled at planing speeds, the boat skims across the water upon a planing area of the forebottom surface and a planing area of the aftbottom surface with the midbottom surface lifted out of the water.

25 Claims, 6 Drawing Sheets

BOAT HAVING HULL MEMBERS WITH SEPARATE FORE AND AFT PLANING SURFACES

BACKGROUND OF THE INVENTION

1. Field of the Invention

The present invention relates generally to boats and particularly, but not by way of limitation, to a twin-hulled power boat or a catamaran sailboat.

2. Description of Related Art

In the design of sailing craft, it is typically desirable to achieve the greatest speed possible without introducing too much instability. The speed and stability of a sailboat are affected by a number of factors, such as the sail area, the amount of wetted surface area of the hulls, and the overall center of gravity of the craft.

In the case of catamarans, stability is particularly important. When a catamaran is driven hard, the aft end may lose stability and flip upward and forward. This disastrous phenomenon, called "pitchpoling," is such a problem that it has been referred to as "the scourge of catamarans."

SUMMARY OF THE INVENTION

The present invention comprises a boat having hull members shaped to provide both speed and stability. Each one of the hull members has a forebottom surface, an aftbottom surface and a midbottom surface.

Both the forebottom surface and the aftbottom surface have a positive angle of incidence with respect to the water surface. The midbottom surface is recessed into the hull member such that, at planing speeds, the boat planes on a portion of the forebottom surface and on a portion of the aftbottom surface.

One object of the present invention is to provide a boat with hull members which have a relatively small overall wetted area under planing conditions in order to obtain high speeds.

Another object of the present invention is to provide a boat with hull members which have two wetted areas, one fore and one aft, in order to maintain stability at planing speeds.

Yet another object of the present invention is to provide a boat with a center of gravity between fore and aft wetted areas of the hulls of the craft so that more power can be applied to the craft without sacrificing stability.

Other objects, features and advantages of the present invention are apparent from the following detailed description when read in conjunction with the accompanying drawings and appended claims.

DETAILED DESCRIPTION OF THE PREFERRED EMBODIMENTS

Figure 1:
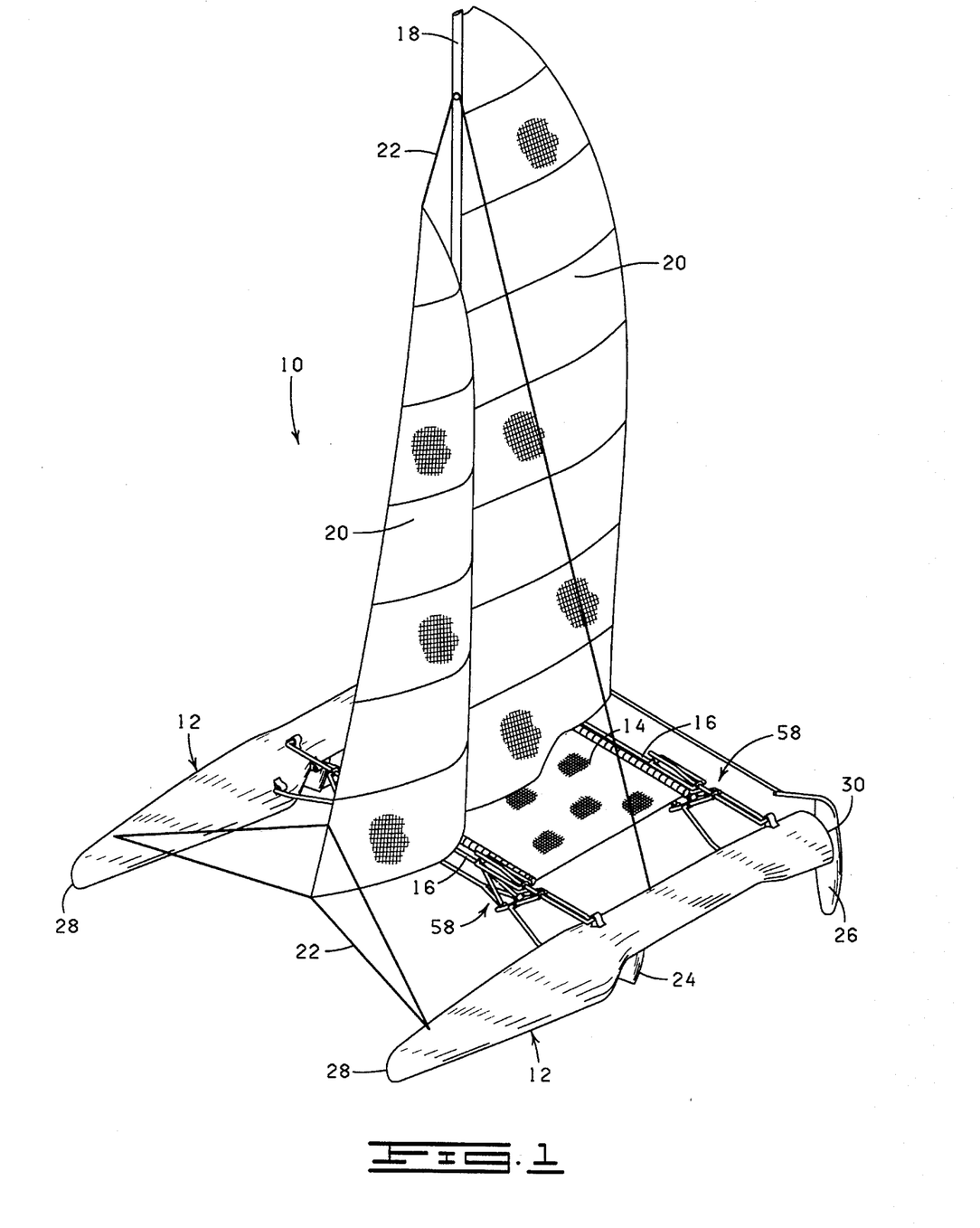
FIG. 1 is a perspective view of a catamaran sailboat craft constructed in accordance with the present invention.

Referring to the drawings in general, and to FIG. 1 in particular, shown therein and designated by the general reference numeral 10 is a catamaran sailboat, which includes a pair of hull members 12, a trampoline deck 14 suspended on a frame 16, a mast 18, sails 20 and rigging 22.

It should be appreciated that each hull member 12 is equipped with any suitable daggerboard 24 and rudder assembly 26 known in the art. It should also be appreciated that any conventional arrangement of sails and rigging may be utilized with the sailboat 10.

Figure 2:
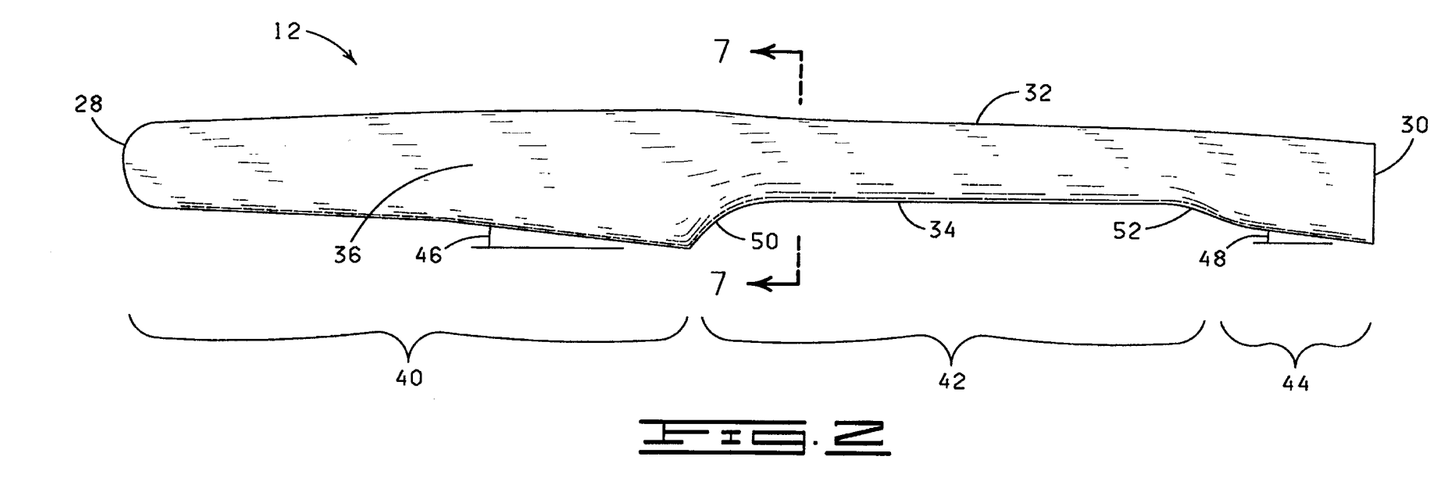
FIG. 2 is a side elevation of one of the hull members of the sailboat of FIG. 1.
Figure 3:
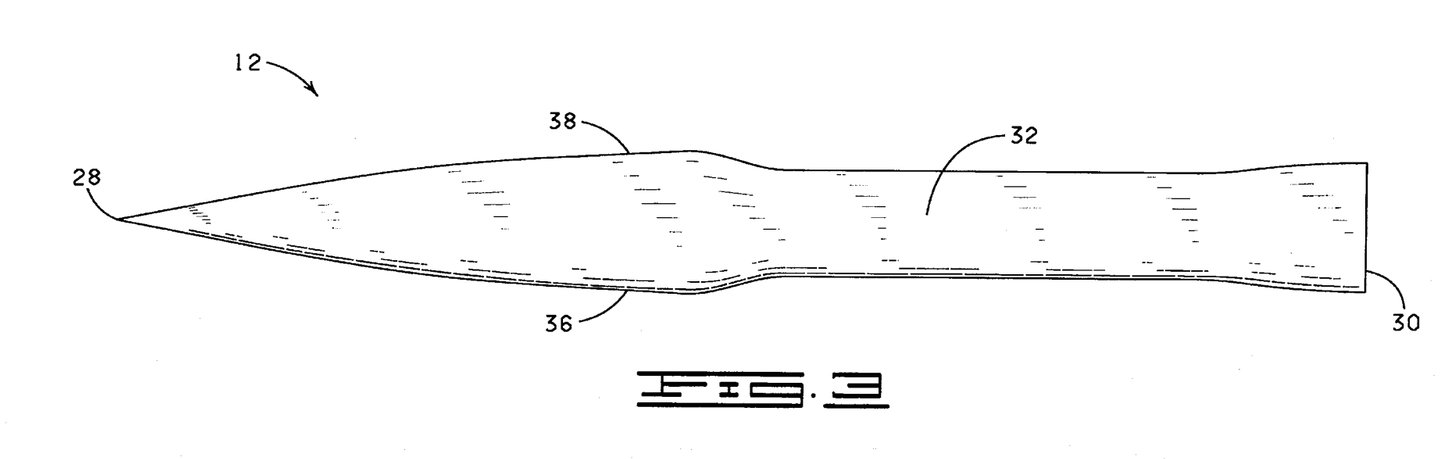
FIG. 3 is a top view of the hull member of FIG. 2.
Figures 4, 5, 6, 7:
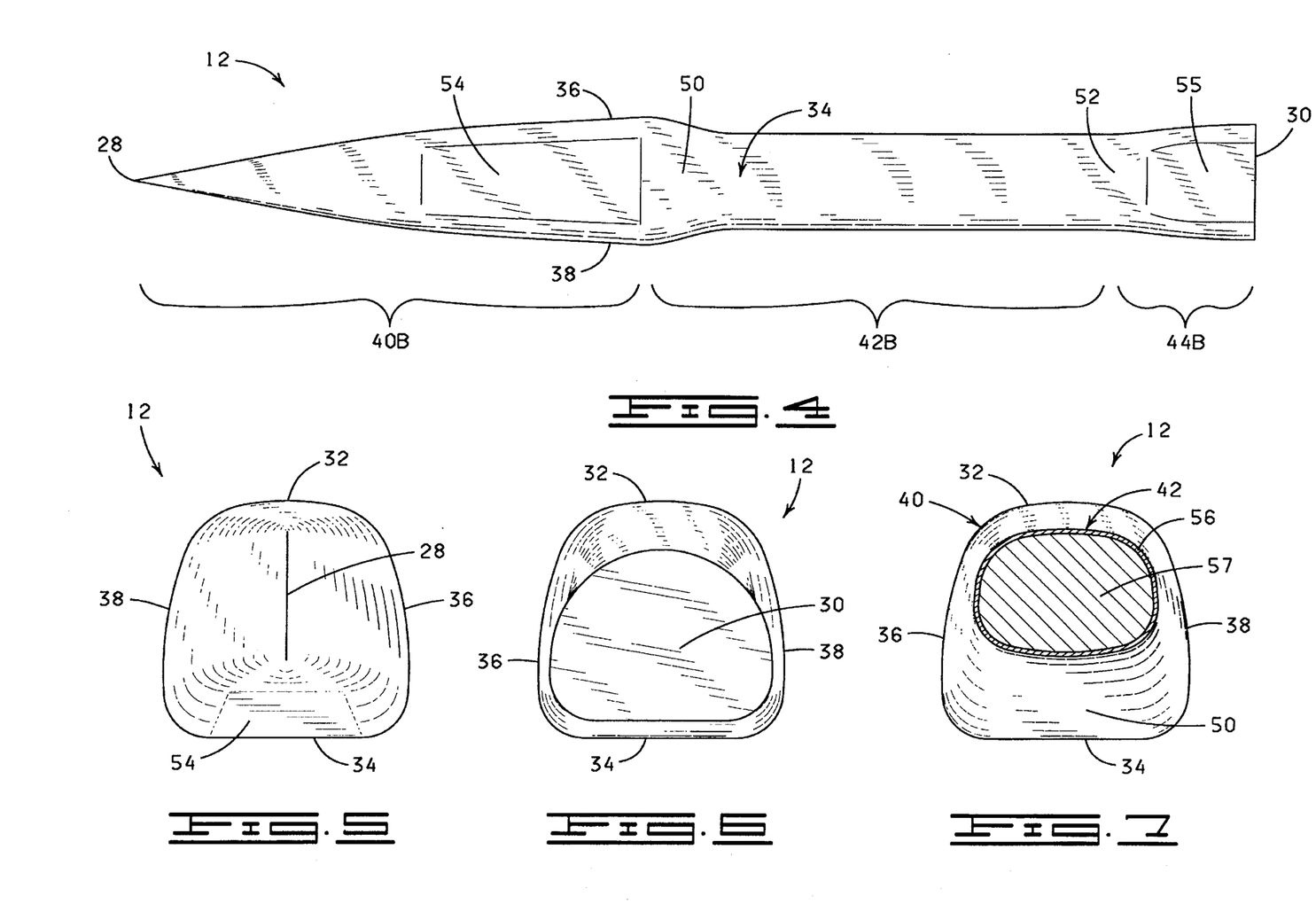
FIG. 4 is a bottom view of the hull member of FIG. 2.
FIG. 5 is a front view of the hull member of FIG. 2.
FIG. 6 is a rear view of the hull of FIG. 2.
FIG. 7 is a sectional view of the hull member taken along the lines 7—7 of FIG. 2.

Turning to FIGS. 2 through 6, shown therein is one of the hull members 12 of the sailboat 10. Each hull member 12 has a front end 28, a rear end 30, a top surface 32 and a bottom surface 34. As best seen in FIGS. 3 through 5, the front end 28 of each hull member 12 tapers to a point. As illustrated by FIGS. 2, 3, 4 and 6, the rear end 30 of each hull member 12 is typically squared off.

The exact shape of the upper surface 32 of each hull member 12 is not particularly important with respect to the present invention. Typically, the upper surface 32 of each hull member 12 is relatively flat and rounds off in a smooth transition to the sides 36 and 38 of the hull member 12.

However, the shape of the bottom surface 34 of each hull member 12 is crucial to the present invention. As best illustrated by FIG. 2, three parts of each hull member 12 may be identified: a forward portion 40, an intermediate portion 42 and an after portion 44.

As illustrated by FIG. 2, the forward portion 40 slopes downward from the front end 28 to define a trim angle 46 in the range of 0 degrees to 20 degrees. In a similar fashion, the after portion 44 slopes downward toward the rear end 30 of the hull member 12 to define a rear trim angle 48 in the range of 0 degrees to 20 degrees.

The intermediate portion 42 of each hull member 12 arches upward from the forward portion 40 and from the after portion 44. The forward arch 50 of the intermediate area 42 is more pronounced than the after arch 52 of the intermediate area 42. The intermediate area 44 of each hull member 12 is substantially uniform in size and shape between the forward arch 50 and the after arch 52.

Turning to FIG. 4, shown therein is the bottom surface 34 of one of the hull members 12. The bottom surface 34 of each hull member 12 includes a forebottom surface 40B, a midbottom surface 42B, and an aftbottom surface 44B. The bottom surfaces 40B, 42B and 44B correspond to the portions 40, 42 and 44, respectively, of each hull member 12.

The forebottom surface 40B comes to a point at the front end 28 and gradually widens to its widest part near the fore arch 50 of the midbottom surface 42B. A rearward portion of the forebottom surface 40B defines a first planing area 54, which is a substantially flat surface oriented in accordance with the fore trim angle 46.

The aftbottom surface 44B uniformly widens from the after arch 52 to the rear end 30 of each hull member 12. Further, the aftbottom surface 44B defines a second planing area 55, which is a substantially flat surface oriented in accordance with the after trim angle 48.

In order to reduce the hydrodynamic drag of the sailboat 10, the bottom surface 34 of each hull member 12, and particularly the first and second planing areas 54 and 55, may be coated or inlaid with a substance having a low coefficient of friction. For example, tetrafluoroethylene (TFE) fluorocarbon polymers or fluorinated ethylene propylene (FEP) may be applied to the entire bottom surface 34 or to the first and second planing areas 54 and 55. TFE fluorocarbon polymers and FEP resins are both known under the trademark "TEFLON."

It should be appreciated that the maximum width of the first planing area 54 is equal to or greater than the maximum width of the second planing area 55. With this construction, the second planing area 55 predominantly travels over the water surface in the wake of the first planing area 54.

As illustrated by FIG. 4, the fore arch 50 narrows in transition from the forebottom surface 40B to the midbottom surface 42B. In turn, the after arch 52 widens in the transition from the midbottom surface 42B to the aftbottom surface 44B.

Between the fore arch 50 and the after arch 52, the intermediate portion 42 is substantially uniform in cross section. As illustrated by FIG. 7, the cross-sectional area of the intermediate portion 42 is smaller than the cross-sectional area of the forward portion 40 at the front arch 50.

As shown in FIGS. 2 through 4, the length of the rear portion 44 is substantially shorter than the length of the forward portion 40. The short length of the rear portion 44 and the reduced cross-sectional area of the intermediate portion 42 combine to give each hull member 12 a center of gravity which is forward of that of conventional catamaran hulls.

The power thrust of a sailboat is at the location of the mast, which is a relatively forward position. Thus, the more forward center of gravity of the hull members 12 allows better transfer of power from the sails to the hull members 12 than that achieved with conventional sailboat hulls.

The hull members 12 may be constructed in a wide variety of ways from any suitable materials known in the art. For example, the hull members 12 may be formed in one piece, assembled from left and right halves, or constructed from upper and lower halves. In a preferred embodiment shown in FIG. 7, each hull member 12 comprises an outer shell 56 of "KEVLAR" or the like surrounding a foam core 57. This type of construction is known as foam-core composite hull construction in the industry.

SAILING AND TRANSPORTING CONFIGURATIONS

As illustrated in FIG. 1, each hull member 12 is attached to the frame 16 for the trampoline deck 14 by two support assemblies 58. One support assembly 58 is located toward the front of the frame 16 and the other support assembly 58 is located toward the rear of the frame 16. The support assemblies 58 are provided for converting the hull members 12 between a sailing and a transporting configuration.

Figure 8:
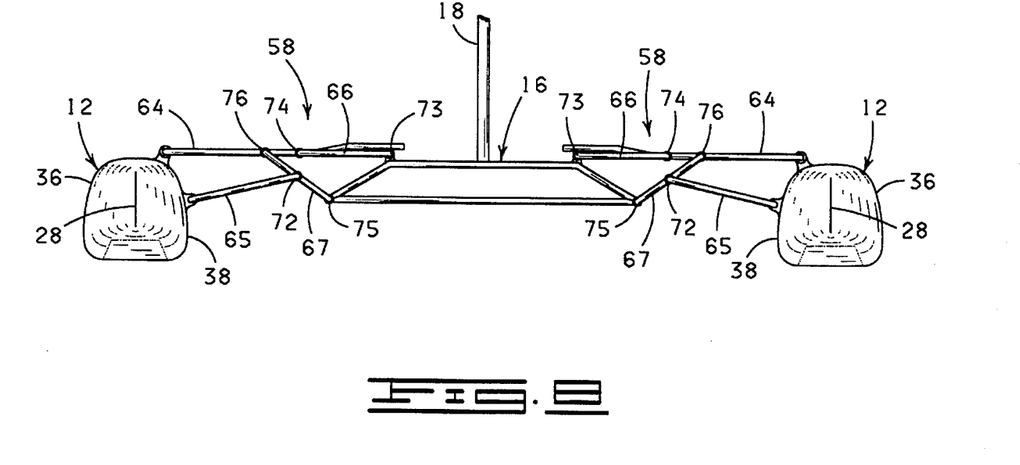
FIG. 8 is a front view of the frame, hull members and support assembly of the sailboat of FIG. 1 with the hull members in the sailing position.
Figure 9:
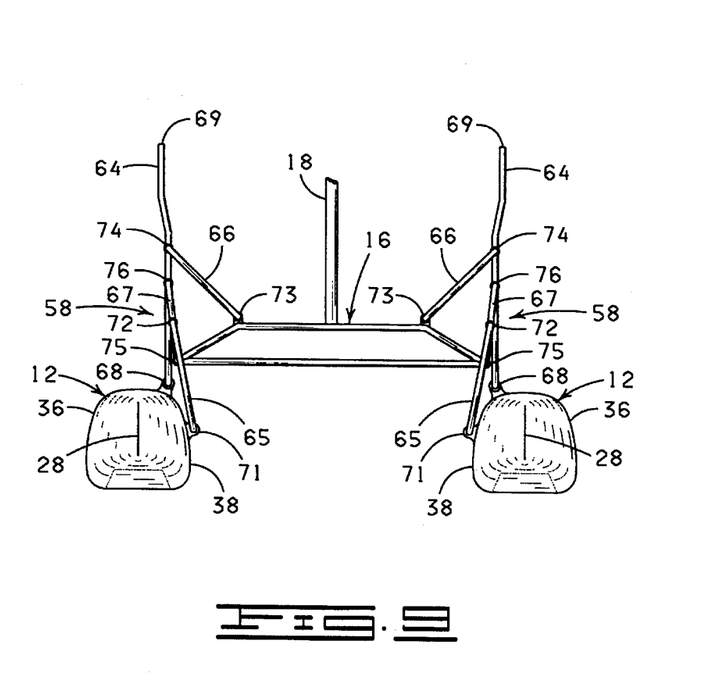
FIG. 9 is same view as FIG. 8, but with the hull members in the transporting position.

With reference to FIGS. 8 and 9, shown therein is the construction of the frame 16 and support assemblies 58. In elevation, the front and rear ends of the frame 16 are trapezoidal in shape. Each support assembly 58 comprises a first arm 64, a second arm 65, a third arm 66 and a fourth arm 67. One end 68 of each first arm 64 is pivotally secured to an upper area of the corresponding hull member 12. The other end 69 of each first arm 64 is free.

One end 71 of each second arm 65 is pivotally mounted to an inner side area of the corresponding hull member 12. The other end 72 of each second arm 65 is pivotally attached to an intermediate point of the corresponding fourth arm 67.

One end 73 of each third arm 66 is pivotally attached to the corresponding upper corner of the frame 16. The other end 74 of each third arm 66 is pivotally attached to the corresponding first arm 64.

One end 75 of each fourth arm 67 is pivotally attached to the corresponding lower corner of the frame 16. The other end 76 of each fourth arm 67 is pivotally attached to an intermediate point of the first arm 64.

When the hull members 12 are in the sailing configuration shown in FIG. 8, the first arm 64 and the third arm 66 of each support assembly 58 are substantially horizontal. The fourth arm 67 is at an angle of about 45 degrees to support the first arm 64. The second arm 65 extends angularly from the corresponding hull member 12 to the fourth arm 67 to secure the hull member 12 in the sailing configuration.

The support assemblies 58 may be locked in the sailing configuration in a wide variety of ways. For example, the first arm 64 of each support assembly 58 may simply be lashed to the frame 16. Alternatively, any conventional locking mechanism may be used to secure the first arm 64 of each support assembly 58 to the frame 16.

When the support assemblies 58 are in the transporting configuration shown in FIG. 9, the first arm 64, the second arm 65 and the fourth arm 67 are substantially vertical. The third arm 66 extends from the frame 16 at an angle of about 45 degrees to hold the corresponding hull member in the transporting configuration.

Thus, the overall width of the sailboat 10 is substantially less in the transporting configuration than in the sailing configuration. The smaller width of the sailboat 10 in the transporting configuration allows the boat 10 to be carried with ease on a boat trailer or in a truck bed.

Further, it should be appreciated that the boat rests on the bottom of the hull members 12 whether in the sailing configuration or in the transporting configuration. In other words, the hull members 12 are bottoms down in both the sailing configuration and in the transporting configuration.

It may be desirable to secure the support assemblies 58 in the transporting configuration when the sailboat 10 is being carried from one location to another. Any conventional locking system may be used to maintain the first arm 64, the second arm 65 and the fourth arm 67 in the upright position during transport of the sailboat 10. For example, each first arm 64 and fourth arm 67 may be provided with eyelets (not shown). The eyelets may be lashed together or secured together with any suitable clasp (not shown) to hold the support assemblies 58 in the transporting configuration.

OPERATION

Figure 10:
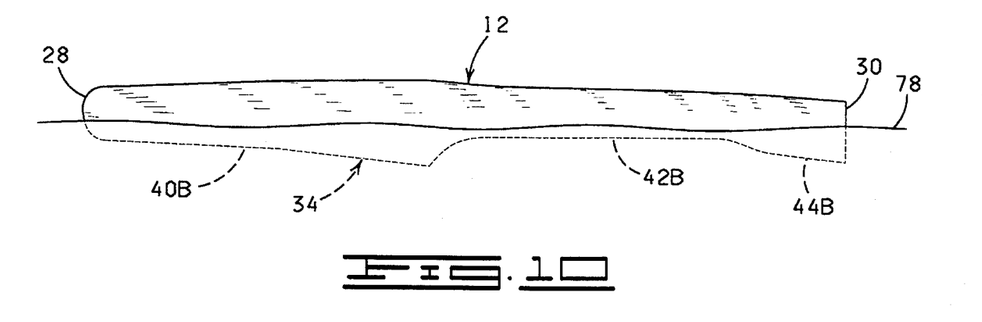
FIG. 10 is a partly diagrammatical side view of the hull member of FIG. 2 in water at a speed slower than minimum planing speed.
Figure 11:
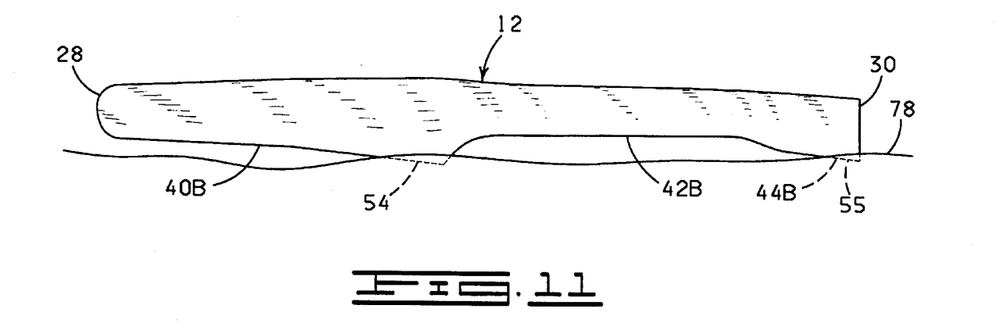
FIG. 11 is the same view as FIG. 10, but with the hull member at a planing speed.

Referring now to FIGS. 10 and 11, shown therein is the operation of one of the hull members 12 in the water. When the sailboat 10 is stopped or traveling at a speed slower than planing speed, the bottom surface 34 of each hull member 12 is below the water surface 78 (as indicated by the dotted lines in FIG. 10).

When the sailboat 10 reaches planing speed, a substantial portion of the bottom surface 34 of each hull member 12 is lifted above the water surface 78, as illustrated by FIG. 11. The forebottom surface 40B is out of the water, except for the planing area 54. Most or all of the midbottom surface 42B is lifted above the water surface 78. At least part of the planing area 55 of the aftbottom surface 44B remains in contact with the water surface 78.

Rather than having a wetted surface which extends for the length of the hull, each hull member 12 has separate wetted surfaces at the first planing area 54 and at the second planing area 55. This reduction of wetted surface under planing conditions enables the sailboat 10 to have increased speed over conventional designs.

The center of gravity of each hull member 12 is between the first planing area 54 and the second planing area 55, near the power thrust from the mast and sails. This construction forces the first and second planing areas 54 and 55 to maintain contact with the water surface 78 under all planing conditions. Thus, the design of the hull members 12 does not sacrifice stability in order to increase speed. By keeping the second planing area 55 in contact with the water surface 78, pitchpoling is prevented.

EMBODIMENT OF FIGS. 12 THROUGH 15

Figure 12:
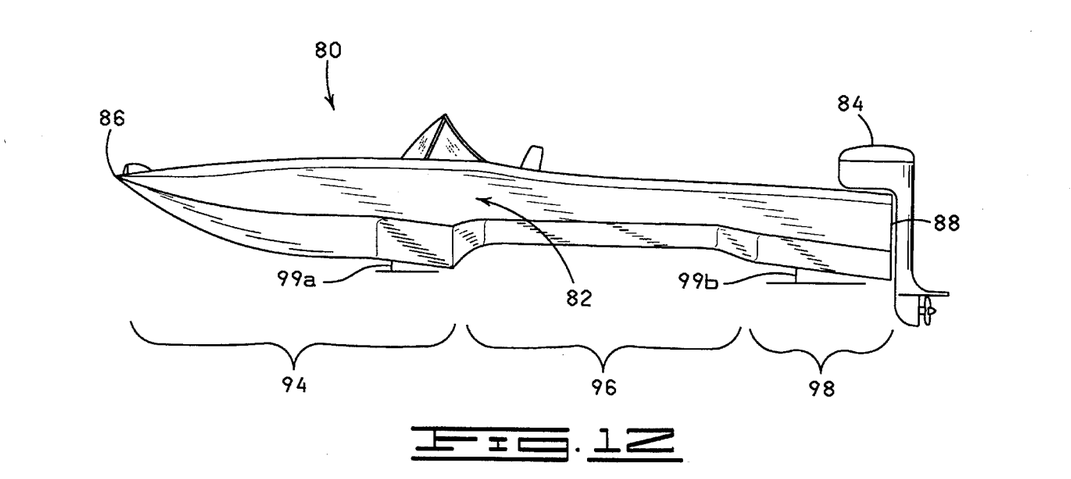
FIG. 12 is a side view of a power boat constructed in accordance with the present invention.

Referring now to FIG. 12, shown therein and designated by reference numeral 80 is a power boat constructed in accordance with the present invention. The power boat 80 comprises a hull 82 and a boat motor 84.

The hull 82 has a forward end or bow 86 and a rear end or stern 88. The motor 84 is mounted to the stern 88 of the power boat 80.

Figure 13:
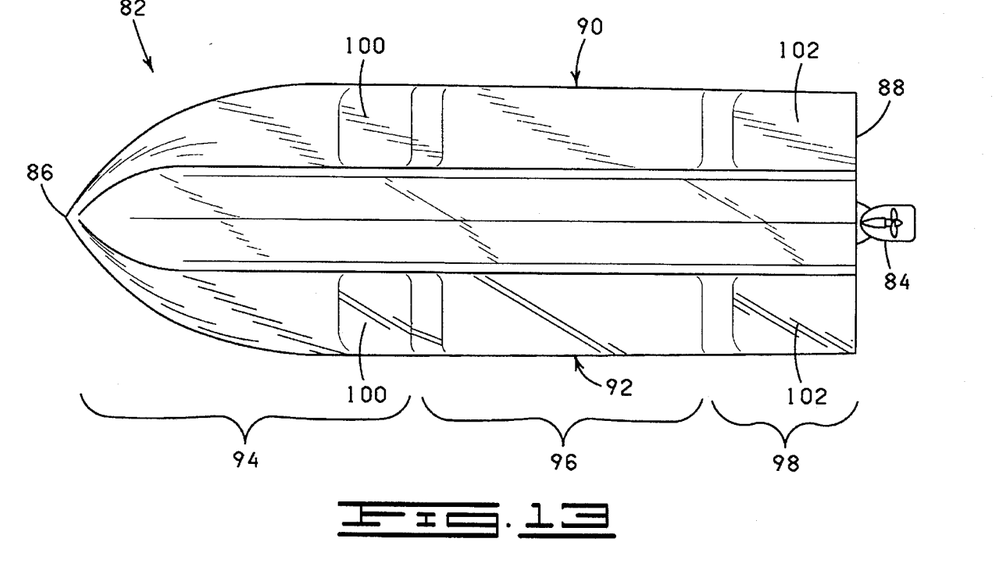
FIG. 13 is a bottom view of the hull of the power boat of FIG. 12.
Figure 14:
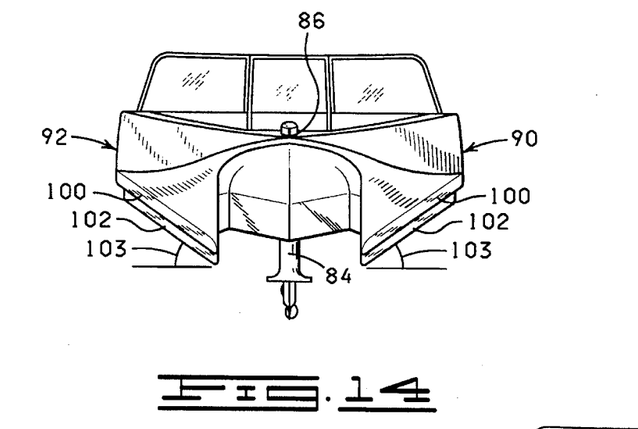
FIG. 14 is a front view of the power boat of FIG. 12.
Figure 15:
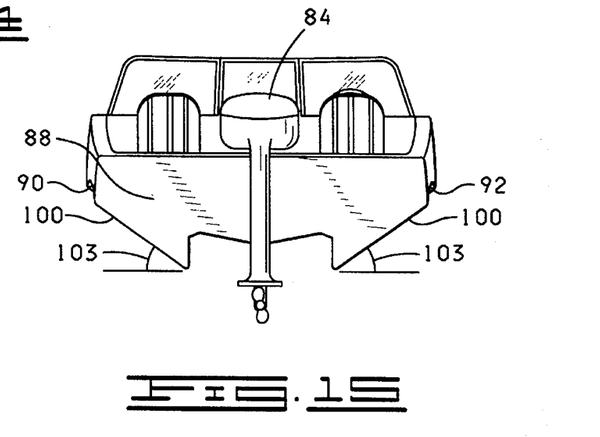
FIG. 15 is a rear view of the power boat of FIG. 12.

Turning to FIGS. 13 through 15, shown therein is the hull 82 of the power boat 80 in greater detail. As best seen in FIG. 13, the hull 82 has a first hull member 90 and a second hull member 92. The first and second hull members 90 and 92 are opposite one another and substantially parallel with one another.

Each one of the hull members 90 and 92 has a forebottom surface 94, a midbottom surface 96 and an aftbottom surface 98. Each forebottom surface 94 and aftbottom surface 98 extends angularly downward and rearward. It should be appreciated that each forebottom surface 94 of the power boat hull 82 has a trim angle 99a in the same range as the forebottom surface 40B of the sailboat hull member 12, which has been described hereinabove. It should also be appreciated that each aftbottom surface 98 of the power boat hull 82 has a trim angle 99b in the same range as the aftbottom surface 44B of the sailboat hull member 12.

Each forebottom surface 94 has a first planing area 100 and each aftbottom surface 98 has a second planing area 102. When the power boat 80 moves over water at a planing speed, the entire bottom surface of the hull 82 is out of the water except for a part or all of the first planing areas 100 and a part or all of the second areas 102.

Further, the planing areas 100 and 102 may be oriented at a wide variety of transverse angles, ranging from about 45 degrees above a horizontal plane to about 45 degrees below a horizontal plane. However, in a preferred embodiment shown in FIG. 14, the planing areas 100 and 102 have transverse angles 103 sloping downward and inward at an angle approximating 45 degrees. With this construction, as the speed of the power boat 80 increases, the portion of the planing areas 100 and 102 in contact with the water surface becomes smaller and more inward.

The midbottom surfaces 96 of the hull members 90 and 92 are upwardly recessed to be out of the water when the power boat 80 is planing. The shape of the midbottom surfaces 96 is substantially the same as the shape of the midbottom surface 42B of the sailing hull member 12. By lifting the midbottom surfaces 96 out of the water, the hull members 90 and 92 have less hydrodynamic drag than conventional power boats. Of course, less drag allows the power boat 80 to attain more speed with less power than conventional power boats.

The friction of the hull members 90 and 92 may be further reduced by coating the bottom surface, or at least the first and second planing areas 100 and 102, with a material having a low coefficient of friction. Substances comprising tetrafluoroethylene (TFE) fluorocarbon polymers or fluorinated ethylene-propylene (FEP) may be used to reduce the friction of the hull members 90 and 92. Such materials are commonly identified by the trademark "TEFLON."

The center of gravity of the power boat 80 is more rearward than the center of gravity of the sailboat 10. Further, the driving force, i.e. the boat motor 84, is at the rear 88 of the power boat 80. In order to compensate for the more rearward center of gravity and the rear power thrust, the second planing areas 102 are greater in length than the first planing areas 100 of the hull members 90 and 92.

It should be appreciated that the power boat hull 82 with hull members 90 and 92 may be molded or constructed in one piece. Alternatively, the power boat hull 82 may be assembled from two separate hull members 90 and 92, cockpit and deck section.

The power boat hull 82 may be utilized with a wide range of power boats used for pleasure, fishing, recreation or racing. Further, the power boat hull 82 may be used with boats of all sizes, from the smallest model boats to mini-jet boats to the largest of pleasure craft.

It should be understood that the present invention is not limited to boats having exactly two hull members, but may encompass boats having a greater or lesser number of hull members. For example, the present invention may be applicable to tri-hulled or a mono-hulled boat of the sailing or motor-powered variety.

Changes may be made in the combinations, operations and arrangements of the various parts and elements described herein without departing from the spirit and scope of the invention as defined in the following claims.

What is claimed is:

1. A boat comprising:

a pair of hull members, each one of said hull members having a forebottom surface, an aftbottom surface and a midbottom surface, the forebottom surface having a first planing area with a positive trim angle, the aftbottom surface having a second planing area with a positive trim angle, the midbottom surface separating the forebottom surface from the aftbottom surface and being recessed into the hull member, and the bottommost portions of each one of the hull members being an aftward portion of the forebottom surface and an aftward portion of the aftbottom surface;

a frame attached to said hull members to support said hull members in a substantially parallel, spaced apart and even arrangement; and means for propelling the boat over a water surface;

wherein the boat propelled at a planing speed has at least a portion of the first and second planing areas of each one of said hull members contacting the water surface with the midbottom surface of each one of said hull members lifted above the water surface.

2. The boat of claim 1 wherein said means for propelling comprises a boat motor.

3. The boat of claim 1 wherein the forebottom surface of each one of said hull members widens from the fore end toward the aft end thereof.

4. The boat of claim 1 wherein the fore area of the midbottom surface symmetrically narrows immediately behind the forebottom surface of each one of said hull members.

5. The boat of claim 1 wherein the aft area of the midbottom surface of each one of said hull members is substantially uniform in width.

6. The boat of claim 1 wherein the trim angle of the forebottom surface of each one of said hull members is in the range of 0 degrees to 20 degrees.

7. The boat of claim 1 wherein the trim angle of the aftbottom surface of each one of said hull members is in the range of 0 degrees to 20 degrees.

8. The boat of claim 1 wherein the forebottom surface of each one of said hull members is greater in length than the aftbottom surface of each one of said hull members.

9. The boat of claim 1 wherein the aftbottom surface of each one of said hull members is less than one-half the length of the forebottom surface of each one of said hull members.

10. The boat of claim 1 further comprising:

a layer of a substance consisting of tetrafluoroethylene or fluorinated ethylene-propylene affixed to and covering the planing portion of the forebottom surface of each one of said hull members.

11. The boat of claim 1 further comprising:

a layer of a substance consisting of tetrafluoroethylene or fluorinated ethylene-propylene affixed to and covering at least the planing portion of the aftbottom surface of each one of said hull members.

12. The boat of claim 1 wherein said means for propelling comprises a sail assembly.

13. The boat of claim 1 wherein said frame comprises a trampoline.

14. The boat of claim 1 further comprising:

support assembly means, connecting said hull members to said frame, for converting the boat between a sailing configuration and a transporting configuration, the support assembly means comprising:

a plurality of support arms, each one of the support arms having a free end and an opposite hull end, the hull end being pivotally attached to an upper portion of a corresponding one of the hull members;

a plurality of first struts, each one of the first struts having a frame end and an opposite arm end, the frame end being pivotally attached to an upper portion of the frame and the arm end being pivotally attached to a medial point of a corresponding one of the support arms;

a plurality of second struts, each one of the second struts having a frame end and an opposite arm end, the frame end being pivotally attached to a lower portion of the frame and the arm end being pivotally attached to a corresponding one of the support arms at a point between the attachment thereto of the respective first strut and the respective hull member; and a plurality of third struts, each one of the third struts having a hull end and an opposite strut end, the hull end being pivotally attached to an inner side portion of a corresponding one of the hull members and the strut end being pivotally attached to a medial point of the respective second strut.

15. The boat of claim 14 wherein said hull members are bottoms down in both the sailing configuration and the transporting configuration.

16. A boat comprising:

a pair of hull members;

a frame adapted to support a person operating the boat;

means for propelling the boat over a water surface; and support assembly means, connecting said hull members to said frame with said hull members positioned on opposite sides of said frame, for converting the boat between a sailing configuration and a transporting configuration, the support assembly means comprising:

a plurality of support arms, each one of the support arms having a free end and an opposite hull end, the hull end being pivotally attached to an upper portion of a corresponding one of the hull members;

a plurality of first struts, each one of the first struts having a frame end and an opposite arm end, the frame end being pivotally attached to an upper portion of the frame and the arm end being pivotally attached to a medial point of a corresponding one of the support arms;

a plurality of second struts, each one of the second struts having a frame end and an opposite arm end, the frame end being pivotally attached to a lower portion of the frame and the arm end being pivotally attached to a corresponding one of the support arms at a point between the attachment thereto of the respective first strut and the respective hull member; and a plurality of third struts, each one of the third struts having a hull end and an opposite strut end, the hull end being pivotally attached to an inner side portion of a corresponding one of the hull members and the strut end being pivotally attached to a medial point of the respective second strut.

17. A boat hull comprising:

a forebottom surface having a fore end, an aft end and a positive trim angle, said forebottom surface widening from the fore end toward the aft end thereof;

an aftbottom surface having a fore end, an aft end and a positive trim angle; and a midbottom surface recessed into the hull, the midbottom surface having a fore arch extending to the forebottom surface and an aft arch extending to the aftbottom surface;

wherein the bottommost portions of the boat hull are an aftward portion of the forebottom surface and an aftward portion of the aftbottom surface.

18. The boat hull of claim 17 wherein the aft area of said midbottom surface is substantially uniform in width.

19. The boat hull of claim 17 wherein the trim angle of said forebottom surface is in the range of 0 degrees to 20 degrees.

20. The boat hull of claim 17 wherein the trim angle of said aftbottom surface is in the range of 0 degrees to 20 degrees.

21. The boat hull of claim 17 wherein said forebottom surface is greater in length than said aftbottom surface.

22. The boat hull of claim 17 wherein said aftbottom surface is less than one-half the length of said forebottom surface.

23. The boat hull of claim 17 further comprising:
a layer of a substance consisting of tetrafluoroethylene or fluorinated ethylene-propylene affixed to and covering at least a portion of said forebottom surface.

24. The boat hull of claim 17 further comprising:
a layer of a substance consisting of tetrafluoroethylene or fluorinated ethylene-propylene affixed to and covering at least a portion of said aftbottom surface.

25. A boat comprising:
a pair of hull members, each one of said hull members having a forebottom surface, an aftbottom surface and a midbottom surface; the forebottom surface having a first planing area with a positive trim angle, the aftbottom surface having a second planing area with a positive trim angle, the midbottom surface separating the forebottom surface from the aftbottom surface and being recessed into the hull member with the midbottom surface extending to the aftbottom surface in an arcuate manner;

a frame attached to said hull members to support said hull members in a substantially parallel, spaced apart and even arrangement; and means for propelling the boat over a water surface;

wherein the boat propelled at a planing speed has at least a portion of the first and second planing areas of each one of said hull members contacting the water surface with the midbottom surface of each one of said hull members lifted above the water surface.

* * * * *